June 30, 1953 — L. C. WOODS — 2,643,504
FENCE GUIDE FOR MOWERS
Filed Feb. 16, 1951
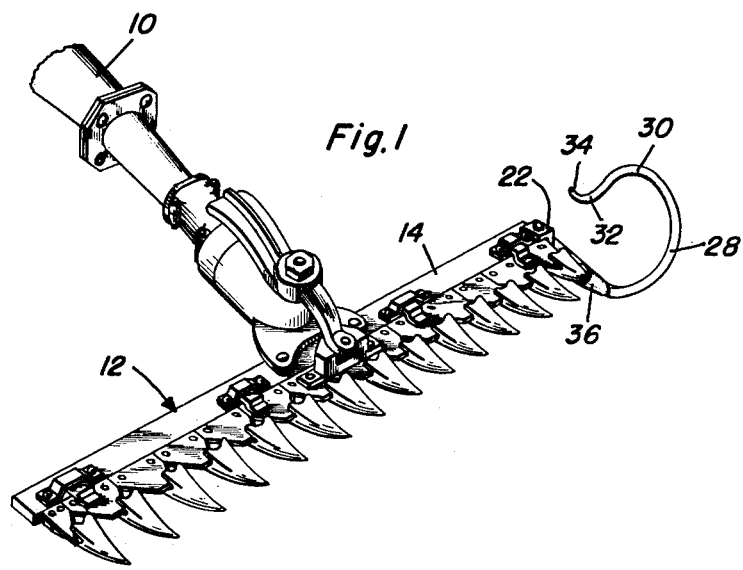
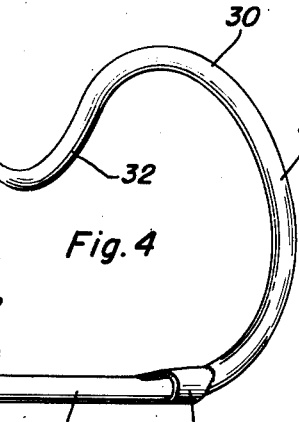
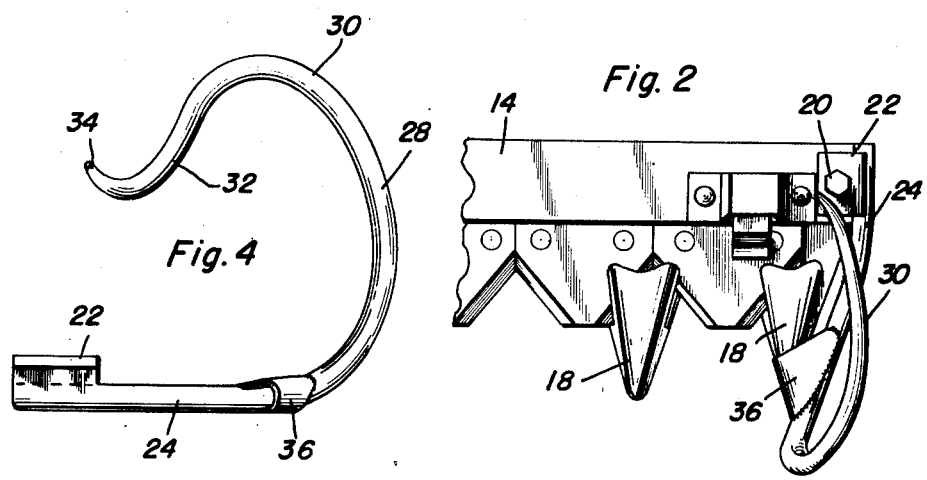
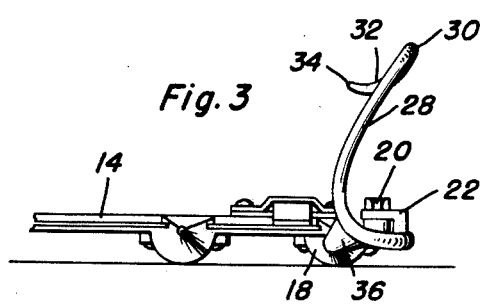
Lowell C. Woods
INVENTOR.

Patented June 30, 1953

2,643,504

UNITED STATES PATENT OFFICE 2,643,504

FENCE GUIDE FOR MOWERS

Lowell C. Woods, Greenfield, Ohio

Application February 16, 1951, Serial No. 211,278

2 Claims. (Cl. 56—307)

This invention relates to an improved attachment for a power mower of the reciprocating type.

An object of this invention is to provide a guide which serves also as a guard even though the principal function is a guiding function, said guide being so constructed as to retain the sickle bar of a garden tractor mower spaced sufficiently from a fence when mowing close to the fence.

Another object of this invention is to provide a curvature of the guide whereby in backing the tractor with the mower attached to it in such a way to cause the mower to move into the fence, the fence wire is not caught and yet, the guide is so curved as to urge the weeds at the ends of the device down and away from the path of operation of the sickle bar.

Ancillary objects and features of importance will become apparent in following the description of the illustrated form of the invention.

In the drawings:

Figure 1 is a perspective view of a standard mower having the attachment thereon;

Figure 2 is an enlarged fragmentary plan view of the structure of Figure 1;

Figure 3 is a front view of the structure of Figure 2; and

Figure 4 is a further enlarged elevational view of the attachment.

As illustrated in Figure 1, there is a fragmentary part of a standard connecting bar 10 which is attached to a standard tractor to support the mower 12 so that it is capable of its normal operation. The mower is conventional and derives its operation in the conventional manner and by conventional means. As a part of the standard structure there is a sickle bar 14 provided with guards or guard prongs 18, one end prong of which is employed in holding the attachment (Figure 4) fixed to the mower 12.

A hole is drilled or otherwise formed in the sickle bar 14 near one end thereof and a bolt 20 is threaded therein. This bolt passes through a bracket 22 located at the inner end of the attachment.

The purpose of the attachment and its function is to keep the sickle bar of a garden tractor mower away from a fence sufficiently when mowing close to the fence. Accordingly, the curvature of the attachment is of importance. There is a substantially straight lower portion 24 and it is to the inner end of this lower portion that the bracket 22 is fixed. The straight lower portion is adapted to be fixed against the end of the sickle bar 14. The part of the rod extending from the straight portion 14 is smoothly curved inwardly toward one of the guards 18 of the mower and smoothly curved upwardly. Accordingly, there is a compound curvature. The compound curvature, that is the part of the bar which curves inwardly with respect to the mower or laterally with respect to the straight portion 24 and upwardly, is indicated at 28. Then, the bar curves rearwardly towards the straight portion 24, as at 30, and then curves downwardly to an S-shaped terminus 32 which is tapered at the outer end thereof, as at 34.

There is a plate 36 welded or otherwise rigidly fixed to the bar at the junctions of the compound curvature portion 28 and the straight portion 24 and the plate 36 is so arranged as to form a rearwardly opening pocket into which the outer end of the end guard 18 is fitted for additional support.

In operation, the curvatures described previously in the bar cause the fence wire to move against the appropriate surfaces of the bar and maintain them separate from the cutting portion of the mower. When backing the tractor to which the mower is attached, the fence wire being normally spaced from the ground will engage the surface of the S-shaped portion 32, causing the wire to ride thereover. Also, weeds contacting the guard are directed down and away from the mower in operation.

Having described the invention, what is claimed as new is:

1. In a power mower consisting of a sickle bar and a plurality of longitudinally spaced guard prongs projecting forwardly from the sickle bar and including an end prong, a fence guide attachment for the mower comprising a rod member having a lower end portion secured to one end of said sickle bar adjacent said end prong, said rod member extending forwardly and inwardly beyond said end prong then reversely and outwardly from said end prong to a point substantially in a plane perpendicular to the bar and then terminating at a point overlying said bar.

2. The combination of claim 1, and a substantially U-shaped seat forming plate fixed to and straddling said rod member and engaging said end prong to aid in retaining the guide attachment relative to said bar.

LOWELL C. WOODS.

References Cited in the file of this patent

UNITED STATES PATENTS

| Number | Name | Date |
|---|---|---|
| 650,889 | Abrott | June 5, 1900 |
| 783,957 | Hudson | Feb. 28, 1905 |
| 1,567,780 | Allen et al. | Dec. 29, 1925 |
| 2,281,660 | Barr et al. | May 5, 1942 |